United States Patent
Bannoura

(10) Patent No.: US 11,110,601 B2
(45) Date of Patent: Sep. 7, 2021

(54) SCHEDULING ROBOTS FOR ROBOTIC PROCESS AUTOMATION

(71) Applicant: UiPath, Inc., New York, NY (US)

(72) Inventor: Daniel Bannoura, Frisco, TX (US)

(73) Assignee: UIPATH, INC., New York, NY (US)

( * ) Notice: Subject to any disclaimer, the term of this patent is extended or adjusted under 35 U.S.C. 154(b) by 103 days.

(21) Appl. No.: 16/689,193

(22) Filed: Nov. 20, 2019

(65) Prior Publication Data

US 2021/0146537 A1 May 20, 2021

(51) Int. Cl.
G05B 19/042 (2006.01)
B25J 9/16 (2006.01)
H04L 29/08 (2006.01)

(52) U.S. Cl.
CPC ........... B25J 9/1661 (2013.01); B25J 9/1689 (2013.01); H04L 67/125 (2013.01)

(58) Field of Classification Search
CPC ...... B25J 9/1661; B25J 9/1689; B25J 9/0084; H04L 67/125; H04L 41/16; G06F 9/4843; G06F 11/0712; G06F 9/4881; G06F 9/54; G06F 11/3006; G06F 11/3013; G06F 11/3055; G06F 8/34; G06N 20/00; G06Q 10/06; G06Q 10/0633; G06Q 10/10; G06Q 10/06311; G06Q 10/06316; G05B 13/041; G05B 19/042; G05B 2219/40202
See application file for complete search history.

(56) References Cited

U.S. PATENT DOCUMENTS

| | | | |
|---|---|---|---|
| 8,375,389 B2 | 2/2013 | Allen et al. | |
| 9,754,231 B2 | 9/2017 | Channabasavaiah et al. | |
| 10,372,508 B2 | 8/2019 | Hosabettu et al. | |
| 10,860,905 B1 * | 12/2020 | Gligan | G06Q 10/063114 |
| 2010/0064357 A1 | 3/2010 | Baird et al. | |
| 2017/0173784 A1 | 6/2017 | Shah et al. | |
| 2017/0270431 A1 | 9/2017 | Hosabettu et al. | |
| 2018/0197123 A1 | 7/2018 | Parimelazhagan et al. | |
| 2018/0232204 A1 | 8/2018 | Ghatage et al. | |
| 2019/0066013 A1 | 2/2019 | Gupta et al. | |
| 2019/0087395 A1 | 3/2019 | Priestas et al. | |
| 2019/0147382 A1 | 5/2019 | Krishnamurthy | |
| 2019/0155225 A1 | 5/2019 | Kothandaraman et al. | |
| 2019/0209253 A1 * | 7/2019 | Itkowitz | B25J 3/00 |

(Continued)

FOREIGN PATENT DOCUMENTS

| | | |
|---|---|---|
| CN | 109684054 A | 4/2019 |
| JP | 2007-249801 A | 9/2007 |

OTHER PUBLICATIONS

Deloitte, Robotic Process Automation (RPA) Within Federal Identity Management, 2019, Google, p. 1-8 (Year: 2019).*

(Continued)

*Primary Examiner* — McDieunel Marc

(74) *Attorney, Agent, or Firm* — Chiesa Shahinian & Giantomasi PC

(57) ABSTRACT

Systems and methods for performing a robotic process automation (RPA) workflow are provided. An indication to execute a job scheduled for performing an RPA workflow for a user associated with a user group is received. A robot is identified from a robot group associated with the job and having the same access rights as the user group. The robot is dispatched to a computing device to execute the job for performing the RPA workflow.

45 Claims, 10 Drawing Sheets

(56) References Cited

U.S. PATENT DOCUMENTS

| | | | |
|---|---|---|---|
| 2019/0303779 A1 | 10/2019 | van Briggle et al. | |
| 2021/0077203 A1* | 3/2021 | Monteverde | B25J 9/1664 |
| 2021/0078172 A1* | 3/2021 | Cao | G06F 3/04847 |
| 2021/0110256 A1* | 4/2021 | Singh | G06N 3/08 |
| 2021/0110301 A1* | 4/2021 | Singh | G06F 8/60 |
| 2021/0110318 A1* | 4/2021 | Singh | B25J 9/163 |
| 2021/0110345 A1* | 4/2021 | Iyer | G06Q 10/06316 |
| 2021/0114199 A1* | 4/2021 | Mhd | B25J 13/088 |
| 2021/0117302 A1* | 4/2021 | Kadakia | G06F 9/45512 |
| 2021/0117895 A1* | 4/2021 | Tondevold | G06Q 10/06316 |
| 2021/0122045 A1* | 4/2021 | Handa | B25J 9/1661 |
| 2021/0122046 A1* | 4/2021 | Sun | B25J 9/1612 |

OTHER PUBLICATIONS

Zhang et al., Handling temporal constraints in Workflow model for Planning and Scheduling, 2010, IEEE, p. 467-471 (Year: 2010).*

Chen et al., ERWF: Embedded Real-Time Workflow Engine for User-Centric Cyber-Physical Systems, 2011, IEEE, p. 713-720 (Year: 2011).*

Yatskiv et al., Improved Method of Software Automation Testing Based on the Robotic Process Automation Technology, 2019, IEEE, p. 293-296 (Year: 2019).*

"Long Running Workflow—Human Interaction," retrieved online on Aug. 30, 2019, at https://www.flexrule.com/process-automation/, 5 pgs.

"RPA—Robotics Automation Process," retrieved online on Aug. 29, 2019, at https://www.flexrule.com/robotics/?q=/rpa/&, 4 pgs.

"Managed ROC—Robotic Operations Center," Accelirate Inc., retrieved online on Aug. 29, 2019, at https://www.accelirate.com/wp-content/uploads/2019/01/Managed-ROC.pdf, 2 pgs.

"User Guide—Kryon Console v5.19," Kryon Systems Ltd., retrieved online on Aug. 29, 2019, at https://us.v-cdn.net/6030908/uploads/editor/8h/t3jiixqx97t2.pdf, 89 pgs.

"Understanding the RPA Monitor BOTs View," retrieved online on Aug. 29, 2019, at https://jacada.zendesk.com/hc/en-us/articles/360001675452, 5 pgs.

"Pega Robot Manager," Pegasystems, Inc., retrieved online on Sep. 9, 2019, at https://community.pega.com/marketplace/components/pega-robot-manager, 4 pgs.

"Intellibot RPA Platform," Uber Techlabs, retrieved online on Sep. 9, 2019, at https://intellibot.io/, 10 pgs.

"Robotic Process Automation (RPA)," Nice Robotic Automation, retrieved online on Sep. 5, 2019, at https://www.nice.com/websites/rpa/robotic-automation.html. 7 pgs.

YouTube Video "Power Your Document Processes with RPA," Kofax, Inc., uploaded on Nov. 8, 2018, initially retrieved online on Sep. 5, 2019, at https://www.youtube.com/watch?v=cvCxM2mYeCo, Digital Video, 1 pgs.

International Search Report and Written Opinion dated Dec. 2, 2020, in connection with International Patent Application No. PCT/US2020/049281, filed Sep. 3, 2020, 9 pgs.

Office Action dated Jun. 3, 2021, in connection with Korean Patent Application No. 10-2021-7005044, filed Feb. 19, 2021, 12 pgs. (including translation).

* cited by examiner

SCHEDULING ROBOTS FOR ROBOTIC PROCESS AUTOMATION

TECHNICAL FIELD

The present invention relates generally to robotic process automation, and more particularly to scheduling robots for robotic process automation.

BACKGROUND

Robotic process automation (RPA) is a form of process automation that uses software robots to automate workflows and processes. RPA may be implemented in an organization to automate repetitive and/or labor-intensive tasks, thereby reducing costs and increasing productivity.

Typically, RPA is implemented in an organization by provisioning a number of robots for that organization. The robots are utilized by different teams within the organization to perform various processes. However, utilizing the same robot for different teams may lead to privacy issues, as data from one team may then be accessible to another team. Conventionally, to address these privacy issues, dedicated robots are provisioned for each team in the organization. However, this conventional approach requires that these robots to be in an on state, even if not performing a process. This conventional approach results in wastage of resources in the form of licensing cost per robot, power requirements, and computational resources.

BRIEF SUMMARY OF THE INVENTION

In accordance with one or more embodiments, systems and methods for performing a robotic process automation (RPA) workflow are provided. An indication to execute a job scheduled for performing an RPA workflow for a user associated with a user group is received. A robot is identified from a robot group associated with the job and having the same access rights as the user group. The robot is dispatched to a computing device to execute the job for performing the RPA workflow.

In one embodiment, the computing device is woken up to run the robot to execute the job and shut down after the robot completes the job.

In one embodiment, the robot is identified from the robot group associated with the job. The robot may be identified by transmitting a request including a job identification (ID) of the job and receiving a robot ID of the robot from the robot group associated with the job ID.

In one embodiment, an access rights management system is maintained comprising a user group directory associated with the user group and a corresponding robot group directory associated with the robot group. The user group directory associates the user group with the access rights associated with the user group and the robot group directory associates the robot group with the same access rights as the user group.

In one embodiment, the indication to execute the job for performing the RPA workflow for the user is received in response to a triggering event.

In one embodiment, the job is scheduled by receiving a request to perform the RPA workflow for the user, identifying the robot group as corresponding to the user group, and scheduling the job for performing the RPA workflow by the robot of the robot group.

In accordance with one or more embodiments, systems and methods for scheduling a job for performing a robotic process automation (RPA) workflow are provided. A request to perform an RPA workflow for a user associated with a user group is received. A robot group corresponding to the user group and associated with the same access rights as the user group is identified. A job for performing the RPA workflow on a robot of the robot group is scheduled.

In one embodiment, the robot is identified by transmitting a request including a user identification (ID) of the user and receiving a robot group ID of the robot group corresponding to the user ID.

In one embodiment, the robot is dispatched to execute the job for performing the RPA workflow by receiving an indication to execute the job scheduled for performing the RPA workflow for the user, identifying the robot from the robot group, and dispatching the robot to a computing device to execute the job for performing the RPA workflow.

These and other advantages of the invention will be apparent to those of ordinary skill in the art by reference to the following detailed description and the accompanying drawings.

DETAILED DESCRIPTION

Figure 1:
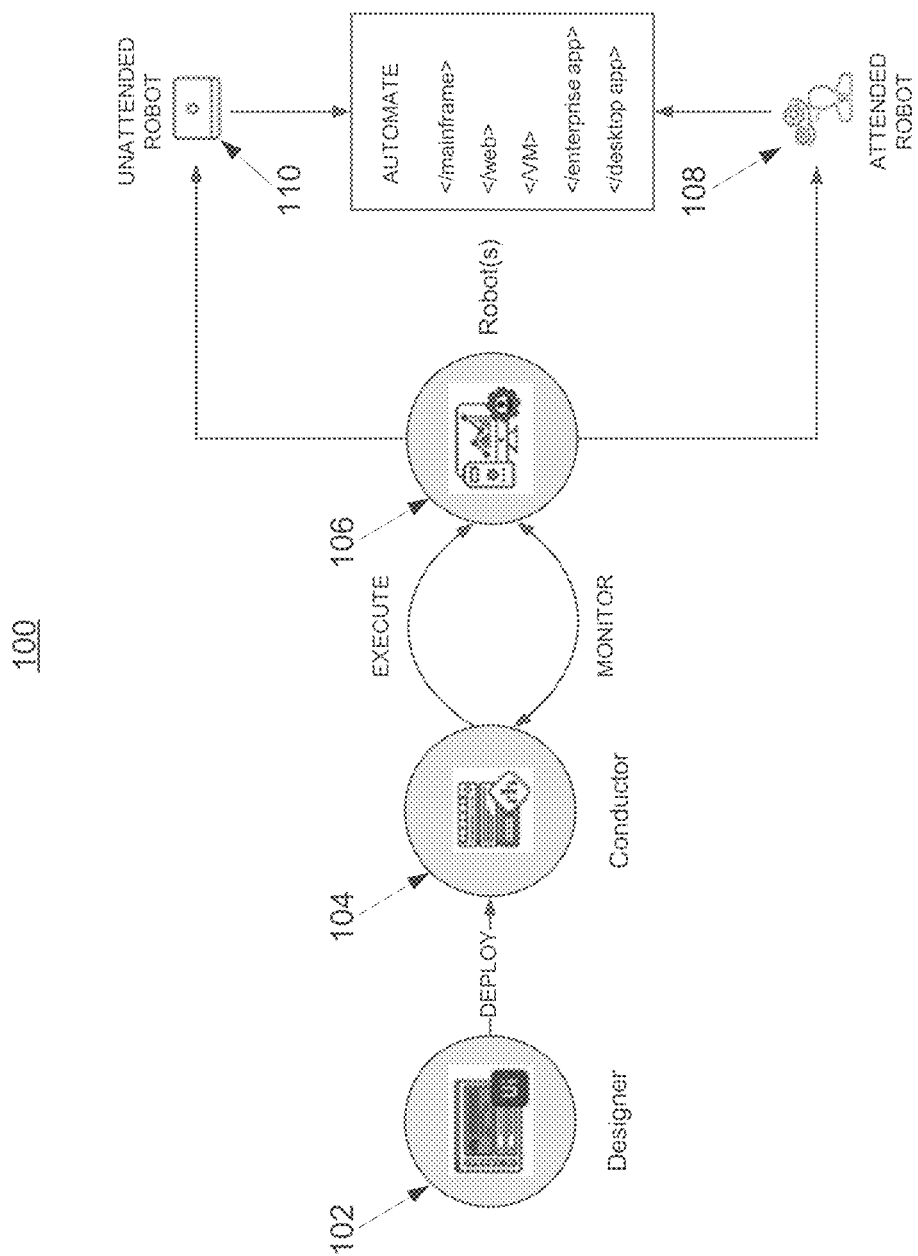
FIG. 1 is an architectural diagram illustrating an robotic process automation system, according to an embodiment of the invention.

Robotic process automation (RPA) is used for automating workflows and processes. FIG. 1 is an architectural diagram of an RPA system 100, in accordance with one or more embodiments. As shown in FIG. 1, RPA system 100 includes a designer 102 to allow a developer to design automation processes using workflows. More specifically, designer 102 facilitates the development and deployment of workflows and robots for performing activities in the workflows. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a workflow, defined herein as "activities." Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 102, execution of business processes is orchestrated by a conductor 104, which orchestrates one or more robots 106 that execute the workflows developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run workflows built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
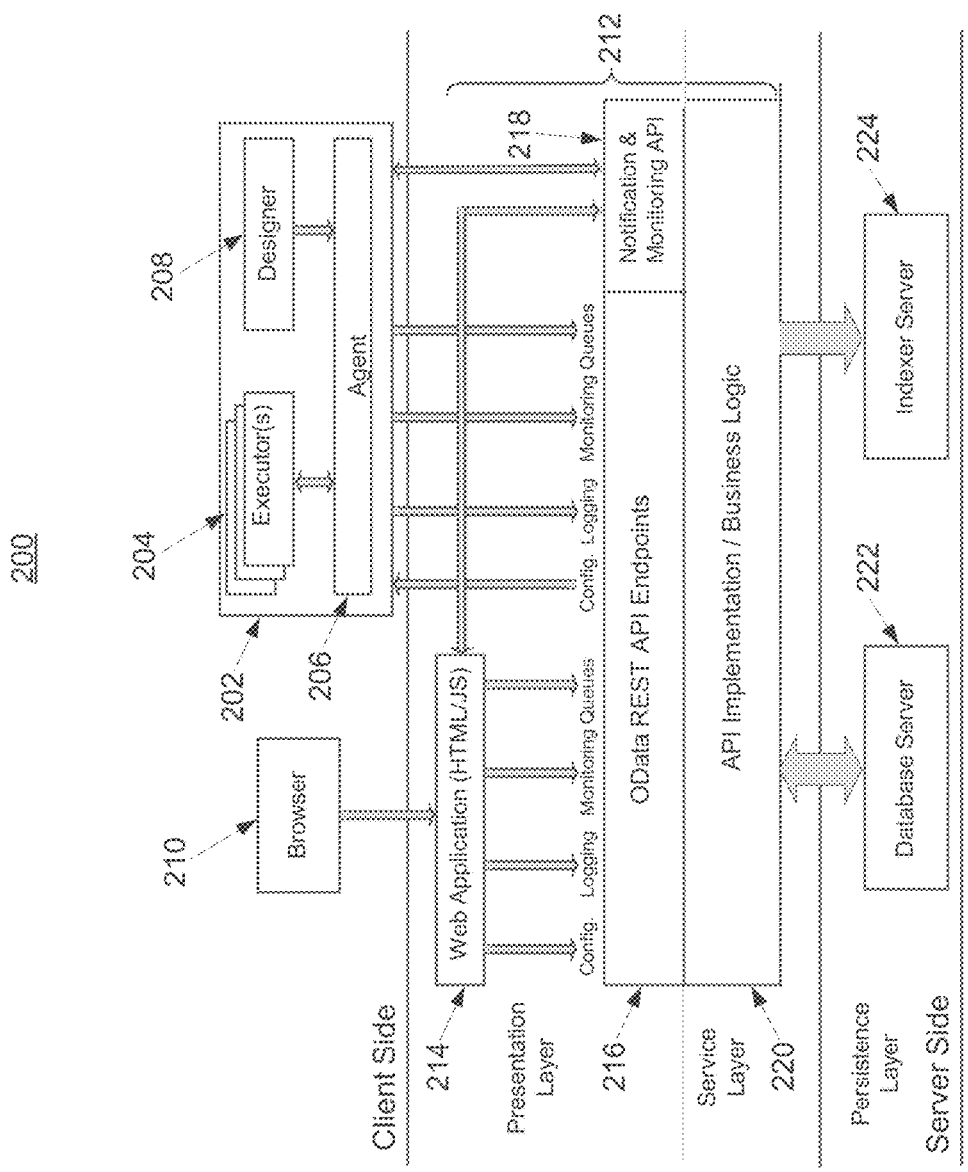
FIG. 2 is an architectural diagram illustrating an example of a deployed robotic process automation system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
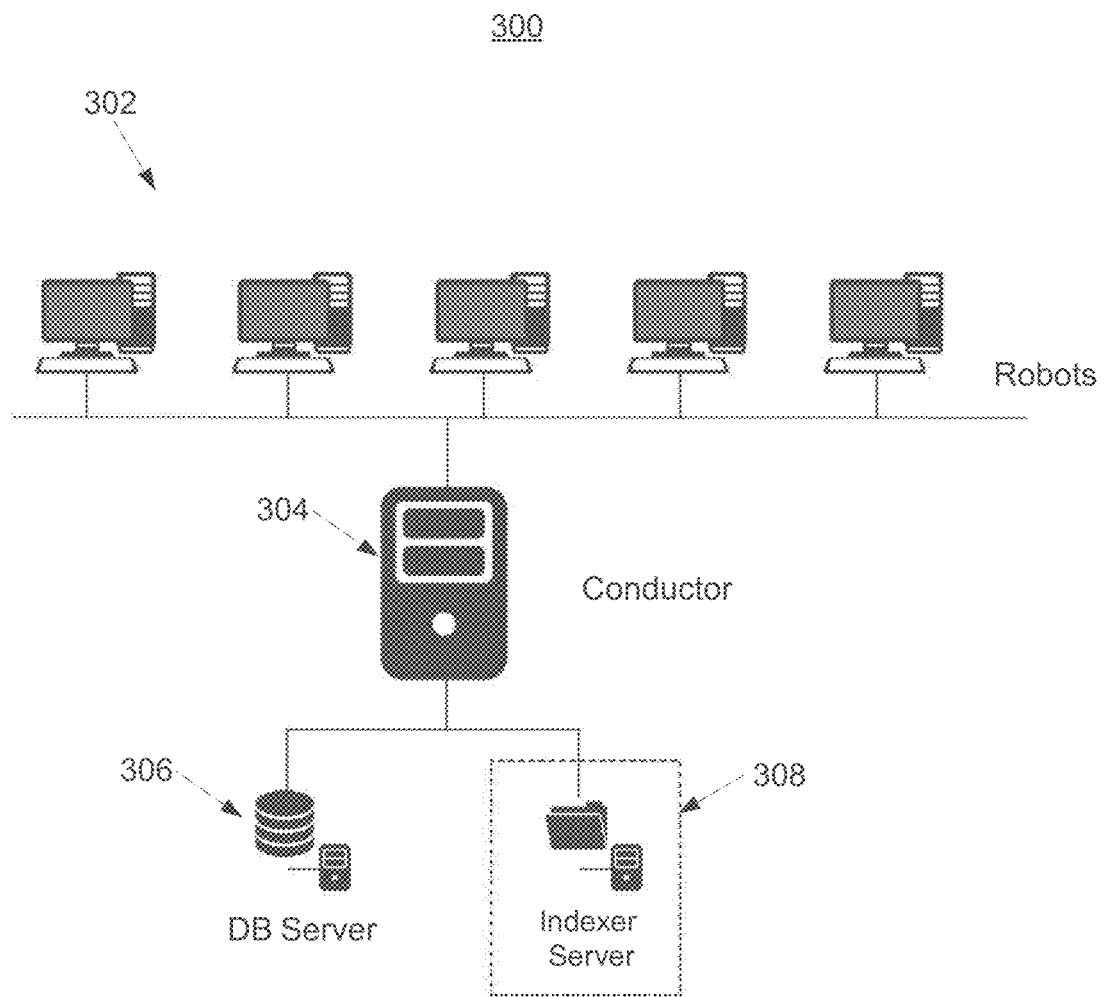
FIG. 3 is an architectural diagram illustrating a simplified deployment example of a robotic process automation system, according to an embodiment of the invention.

FIG. 3 is an architectural diagram illustrating a simplified deployment example of RPA system 300, in accordance with one or more embodiments. In some embodiments, RPA system 300 may be, or may include RPA systems 100 and/or 200 of FIGS. 1 and 2, respective. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

In one embodiment, RPA system 300 may be implemented in or for an organization, such as, e.g., a business, an institution, an association, etc. The organization may include a number of groups (or subgroups). For example, an organization may include a finance and accounting (F&A) group, with an accounts payable (AP) group under the F&A group. Often times, in order to protect confidential and sensitive information, access rights granting or restricting a user access to various files, folders, services, etc. are defined according to the group that the user belongs. Accordingly, an access rights management system, such as, e.g., active directory (AD) or lightweight directory access protocol (LDAP), may be implemented to define access rights for users according to the group that they belong.

Figure 4:
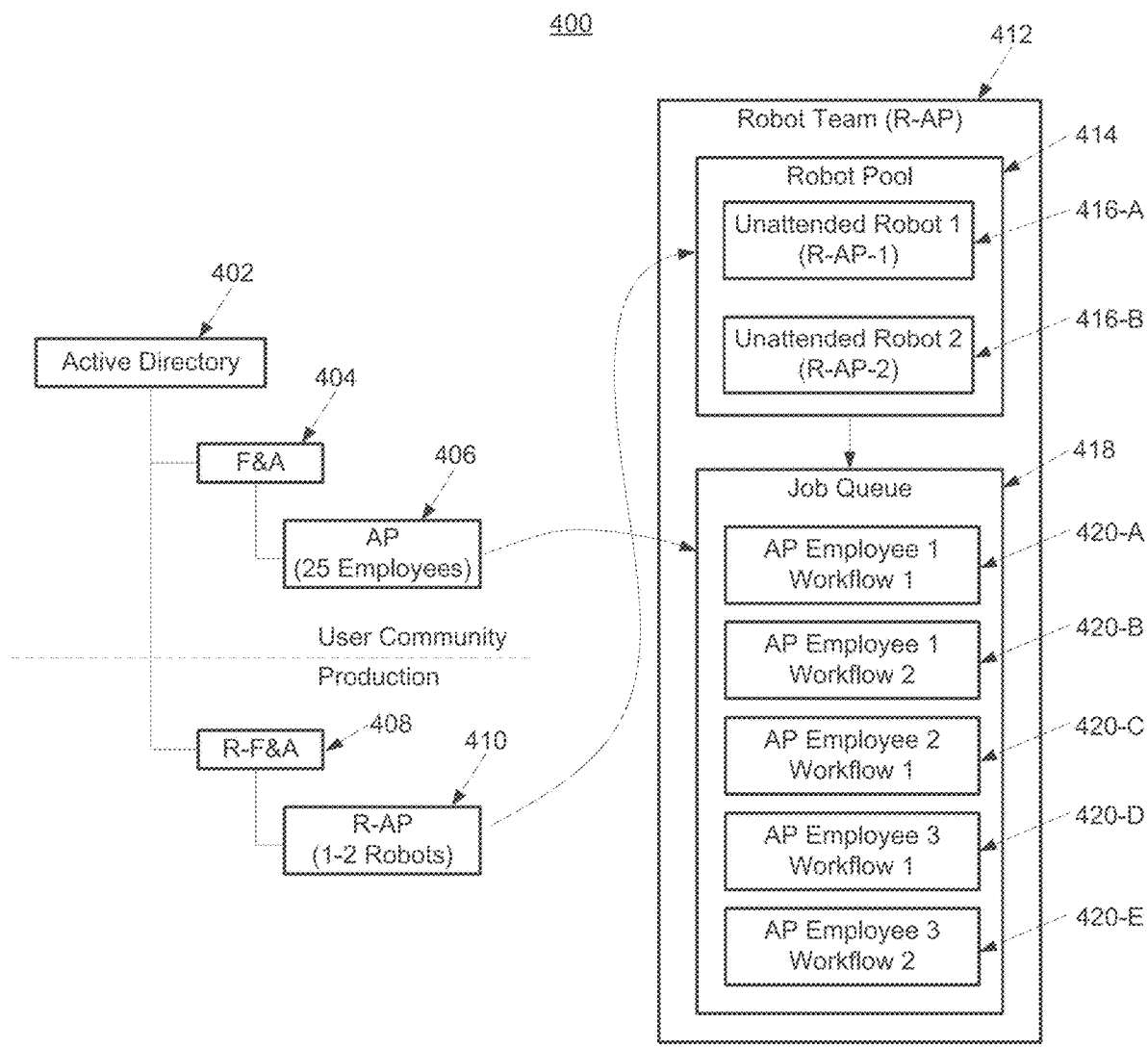
FIG. 4 shows a high-level framework for implementing RPA in an organization, according to an embodiment of the invention.

FIG. 4 shows a high-level framework 400 for implementing RPA in an organization, in accordance with one or more embodiments. Framework 400 includes an active directory 402 (or any other suitable access rights management system) for managing access rights to files, folders, services, etc. for one or more users and robots of the organization.

Active directory 402 manages access rights for users (e.g., employees) in a user community namespace and for robots in a production namespace. As shown in FIG. 4, active directory 402 maintains an F&A user group directory 404 and an AP user group directory 406 under F&A user group directory 404 in the user community namespace. Active directory 402 defines access rights by group. Accordingly, users belonging to an AP group of an organization are associated with AP user group directory 406 of active directory 402 and are assigned the access rights associated with AP user group directory 406. Active directory 402 maintains profiles for each user. The user profiles may comprise a user ID, associated groups, and any other suitable information. When a new user joins (e.g., is hired by) the AP group of the organization, the new user is added to AP user group directory 406 of active directory 402 by creating a profile for the new user associating the new user with AP user group directory 406, thereby assigning the new user access rights associated with AP user group directory 406.

At times, a user may want to deploy a robot for automatically performing one or more workflows. In order for the robot to automatically perform the one or more workflows, the robot may need the same access rights as the user. Accordingly, active directory 402 maintains robot group directories in the production namespace that correspond to user group directories in the user community namespace. Each robot group directory is assigned the same access rights as its corresponding user group directory. As shown in FIG. 4, active directory 402 maintains F&A robot group directory 408 (denoted R-F&A) and AP robot group directory 410 (denoted R-AP) under the R-F&A robot group directory 408. R-F&A group directory 408 has the same access rights as F&A user group directory 404 and R-AP group directory 410 has the same access rights as AP user group directory 406. Active directory 402 maintains profiles for each robot. The robot profiles may comprise a robot ID, associated groups, and any other suitable information.

Robot team R-AP 412 represents a team of robots associated with the AP robot group and assigned to execute processes from users associated with the AP user group. Robot team R-AP 412 comprises robot pool 414 and job queue 418. Robot pool 414 includes unattended robots 416-A and 416-B that are associated with R-AP robot group directory 410 in active directory 402. Job queue 418 represents workflows for users associated with AP user group directory 406. As shown in FIG. 4, job queue 418 comprises workflows 420-A and 420-B for AP employee 1 associated with AP user group directory 406, workflow 420-C for AP employee 2 associated with AP user group directory 406, and workflows 420-D and 420-E for AP employee 3 associated with AP user group directory 406 to be completed by a robot in robot pool 414. When a user associated with AP group directory 406 wants to automatically perform one or more workflows, a robot (i.e., unattended robot 416-A or 416-B) that is associated with a corresponding robot group (i.e., R-AP robot group directory 410), and thus the same access rights as the user, is dispatched.

Figure 5:
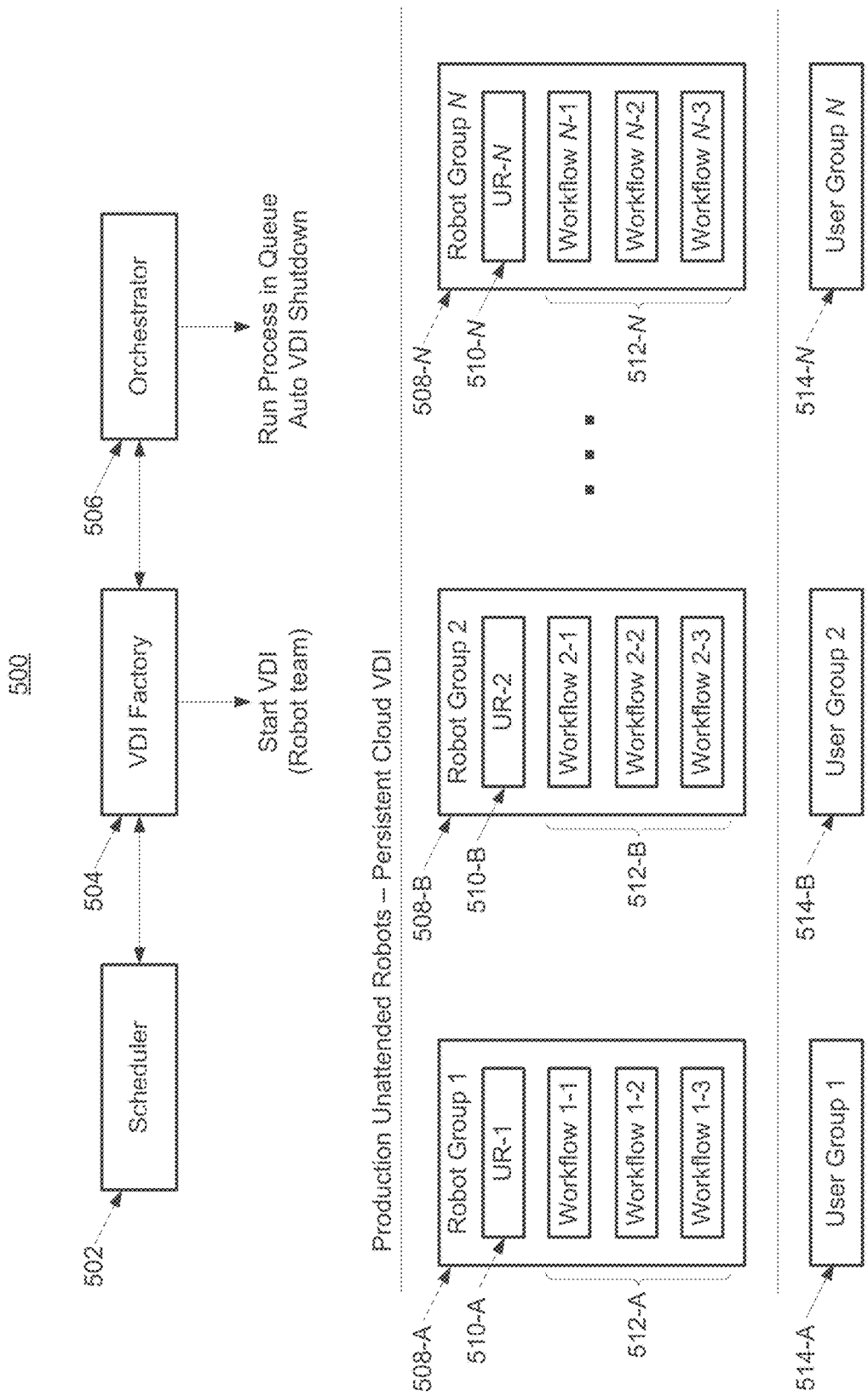
FIG. 5 shows a high-level systems architecture for dispatching robots for performing one or more processes or workflows, according to an embodiment of the invention.

FIG. 5 shows a high-level systems architecture 500 for performing one or more workflows, in accordance with one or more embodiments. Systems architecture 500 comprises scheduler 502, virtual desktop image (VDI) factory 504, and orchestrator 506. In one embodiment, orchestrator 506 may be conductor 104 of FIG. 1, conductor 212 of FIG. 2, or conductor 304 of FIG. 3.

Scheduler 502 schedules when workflows are executed by robots. As shown in systems architecture 500, scheduler 502 schedules robot group 1 508-A, robot group 2 508-B, . . . robot group N 508-N. Robot group 1 508-A represents workflows 512-A for user group 1 514-A scheduled for execution by unattended robot UR-1 510-A. Robot group 2 508-B represents workflows 512-B for user group 2 514-B scheduled for execution by unattended robot UR-2 510-B. Robot group N 508-N represents workflows 512-N for user group N 514-N scheduled for execution by unattended robot UR-N 510-N, where N is any positive integer.

VDI factory 504 is a virtual desktop for managing execution of robots 510-A, 510-B, . . . 510-N for performing workflows 512-A, 512-B, . . . 512-N, respectively. VDI factory 504 receives a message from scheduler 502 indicating that a workflow 1-1 of workflows 512-A, for example, is triggered for execution. VDI factory 504 sends a messages to orchestrator 506 to identify the robot 510-A assigned to execute workflow 1-1 and orchestrator 506 returns the robot ID associated with robot 510-A to VDI factory 504. VDI factory 504 initiates robot 510-A (e.g., starts, wakes up, powers on, signs into, or otherwise makes robot 510-A active and ready) and robot 510-A performs workflow 1-1.

Once robot 510-A completes workflow 1-1, VDI factory 504 shuts down robot 510-A. In one embodiment, VDI factory 504 automatically shuts down robot 510-A based on a preset rule to shut down the robot 510-A after a predetermined period of time of being idle. In another embodiment, orchestrator 506 sends a notification to VDI factory 504 that robot 510-A completed workflow 1-1 and, in response, VDI factory 504 shuts down robot 510-A.

Systems architecture 500 is advantageous in that while an organization can utilize a large number of robots, the number of robots that are concurrently executing at a given time is reduced, thereby minimizing costs due to robot licensing and infrastructure (e.g., power, memory, computer processing, bandwidth, etc.).

While systems architecture 500 provides a high-level overview of embodiments of the present invention, in operation, embodiments of the present invention may be implemented in two stages: a deployment automation stage and a schedule and run automation stage. The deployment automation stage will be described below with respect to FIGS. 6 and 7. The schedule and run automation stage will be described below with respect to FIGS. 8 and 9.

Figure 6:
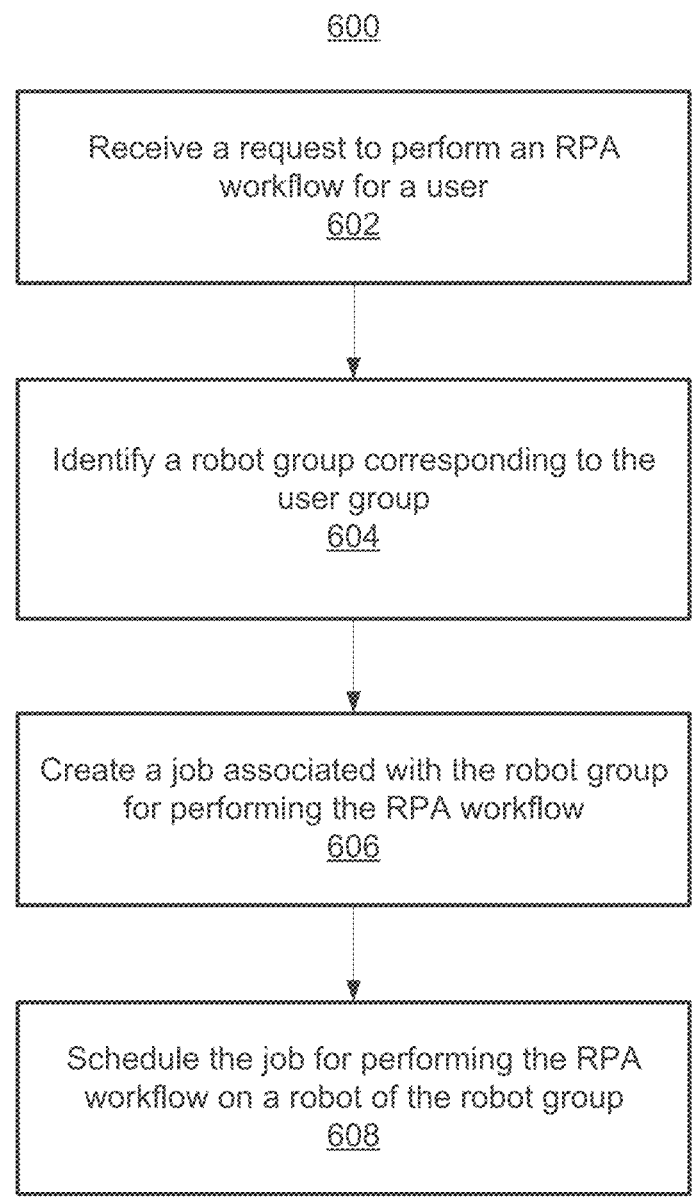
FIG. 6 is a flowchart of a method for scheduling a job, according to an embodiment of the invention.
Figure 7:
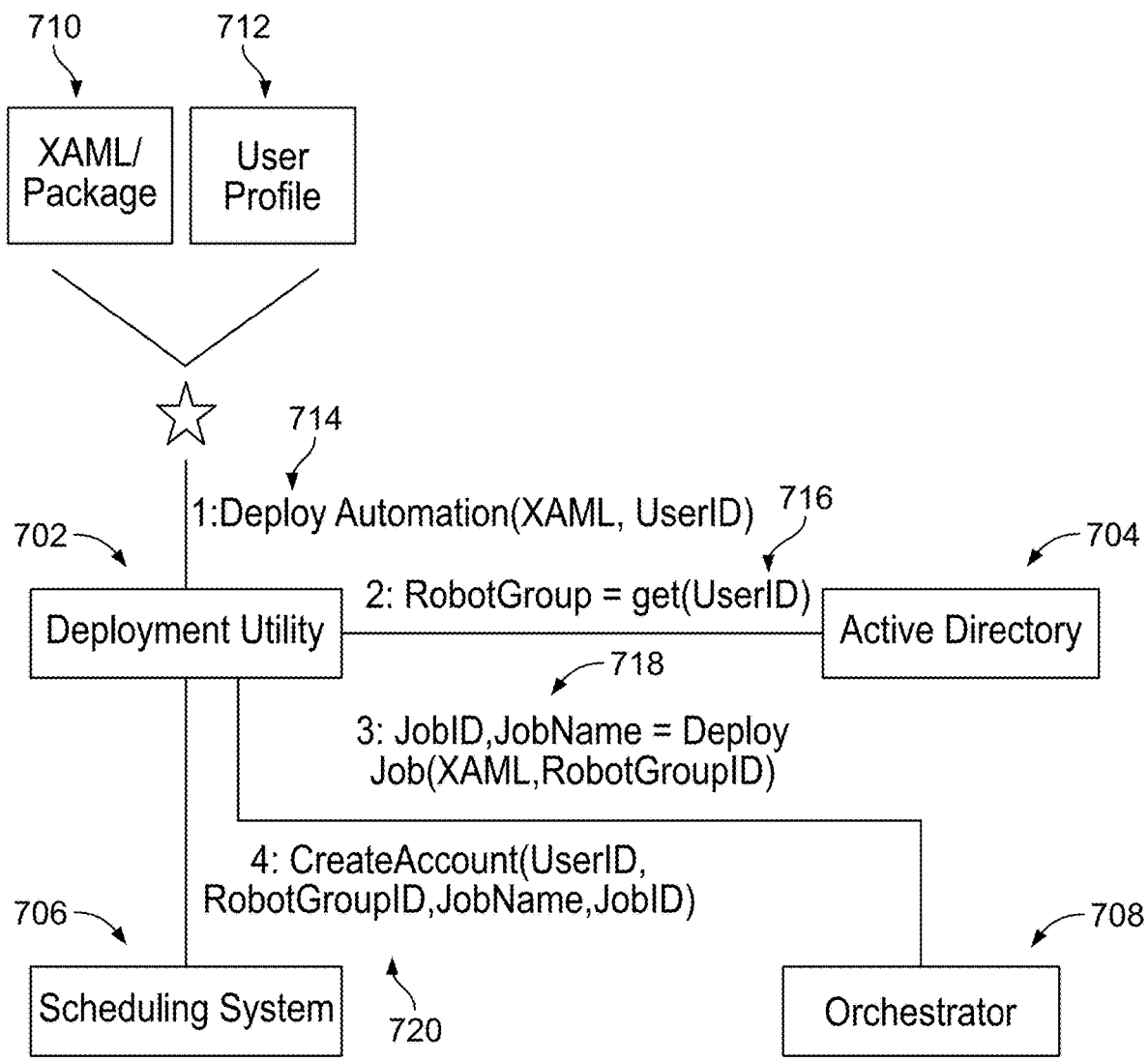
FIG. 7 shows a systems architecture for scheduling a job, according to an embodiment of the invention.

FIG. 6 shows a method 600 for scheduling a job for performing an RPA workflow, in accordance with one or more embodiments. FIG. 6 will be described with reference to systems architecture 700 of FIG. 7. Systems architecture 700 comprises deployment utility 702, active directory 704, scheduling system 706, and orchestrator 708. In one embodiment, scheduling system 706 may be scheduler 502 of FIG. 5, orchestrator 708 may be conductor 104 of FIG. 1, conductor 212 of FIG. 2, conductor 304 of FIG. 3, or orchestrator 506 of FIG. 5, and active directory 704 may be active directory 402 of FIG. 2. The steps of method 600 may be performed by any suitable computing device. In one embodiment, the steps of method 600 are performed by deployment utility 702 of FIG. 7.

At step 602 of FIG. 6, a request to perform an RPA workflow for a user is received. The request to perform an RPA workflow is shown in systems architecture 700 as deployment automation request 714 received by deployment utility 702. Deployment utility 702 may be any suitable computing device for managing deployment and scheduling of a job to scheduling system 706. In one embodiment, deployment utility 702 is a robot, a script, an application navigator, an enterprise connect, an orchestration system, etc. running on a computing device. Deployment automation request 714 comprises XAML/Package 710 and user profile 712. XAML/Package 710 represents a workflow to be performed for the user and user profile 712 is a profile of the user comprising a user ID of the user. In one embodiment, XAML/Package 710 of the workflow may be created (e.g., by the user) using designer 102 of FIG. 1 or designer 208 of FIG. 2.

In one embodiment, the user belongs to a user group associated with access rights. The access rights may be managed and maintained in active directory 704 or any other suitable access rights management system (e.g., LDAP).

At step 604, a robot group corresponding to the user group is identified. Systems architecture 700 shows robot group ID function 716. Robot group ID function 716 represents a request for a robot group ID corresponding to the user ID of the user from deployment utility 702 to active directory 704, and a response identifying the robot group ID corresponding to the user ID of the user transmitted from active directory 704 to deployment utility 702. The request includes the user ID of the user. If a robot group corresponding to the user ID does not exist, active directory 704 creates a new robot group corresponding to the user ID and responds to deployment utility 702 with the robot group ID of the new robot group. In one embodiment, the identified robot group is associated with the same access rights as its corresponding user group in active directory 704.

At step 606, a job associated with the robot group for performing the RPA workflow is created. Systems architecture 700 shows job function 718. Job function 718 represents a request to create a job for performing the workflow represented by XAML/Package 710 by the identified robot group from deployment utility 702 to orchestrator 708, and a response identifying a job ID and a job name from orchestrator 708 to deployment utility 702. The request comprises the XAML/package 710 and the identified robot group ID. Upon receiving the request, orchestrator 708 creates a job for performing the workflow, assigns the job a job name and a job ID, and associates the job with the identified robot group ID.

At step 608, the job for performing the RPA workflow is scheduled on a robot of the robot group. Systems architecture 700 shows a scheduling function 720. Scheduling function 720 represents a request to schedule the job on a robot of the robot group from deployment utility 702 to scheduling system 706. The request comprises the user ID, robot group ID, job name, and job ID. The job is scheduled by scheduling system 706 based on input received by the user. The user may create an account (if not already created) with the user ID, robot group ID, job name, and job ID. Once logged in to the account, the user may schedule the job. The job may be scheduled by the user defining a future time and date for executing the job, or may be scheduled for initiate immediate execution (e.g., by clicking a "run now" button) if there is an on demand option. Scheduling system 706 may be any suitable scheduling system, such as, e.g., node red, BMC, iControl, etc.

Figure 8:
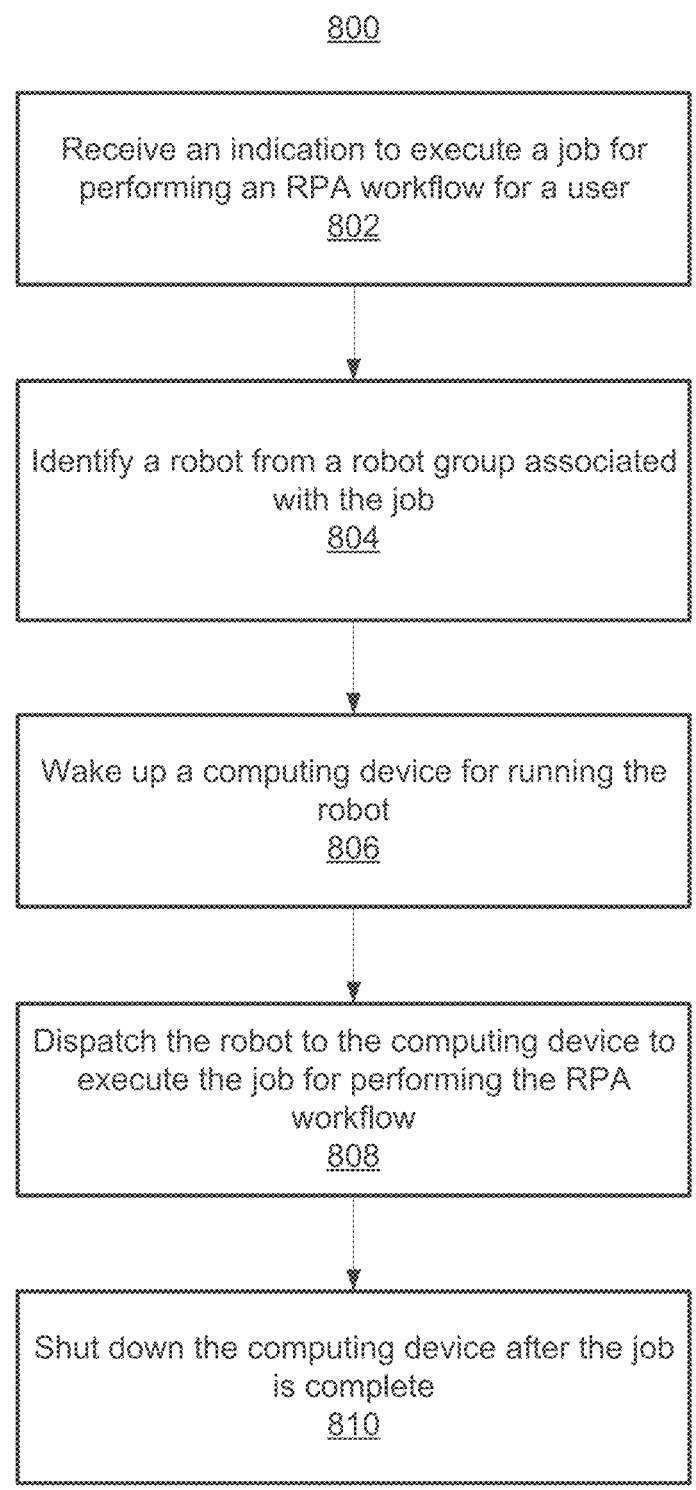
FIG. 8 is a flowchart of a method for performing a job, according to an embodiment of the invention.
Figure 9:
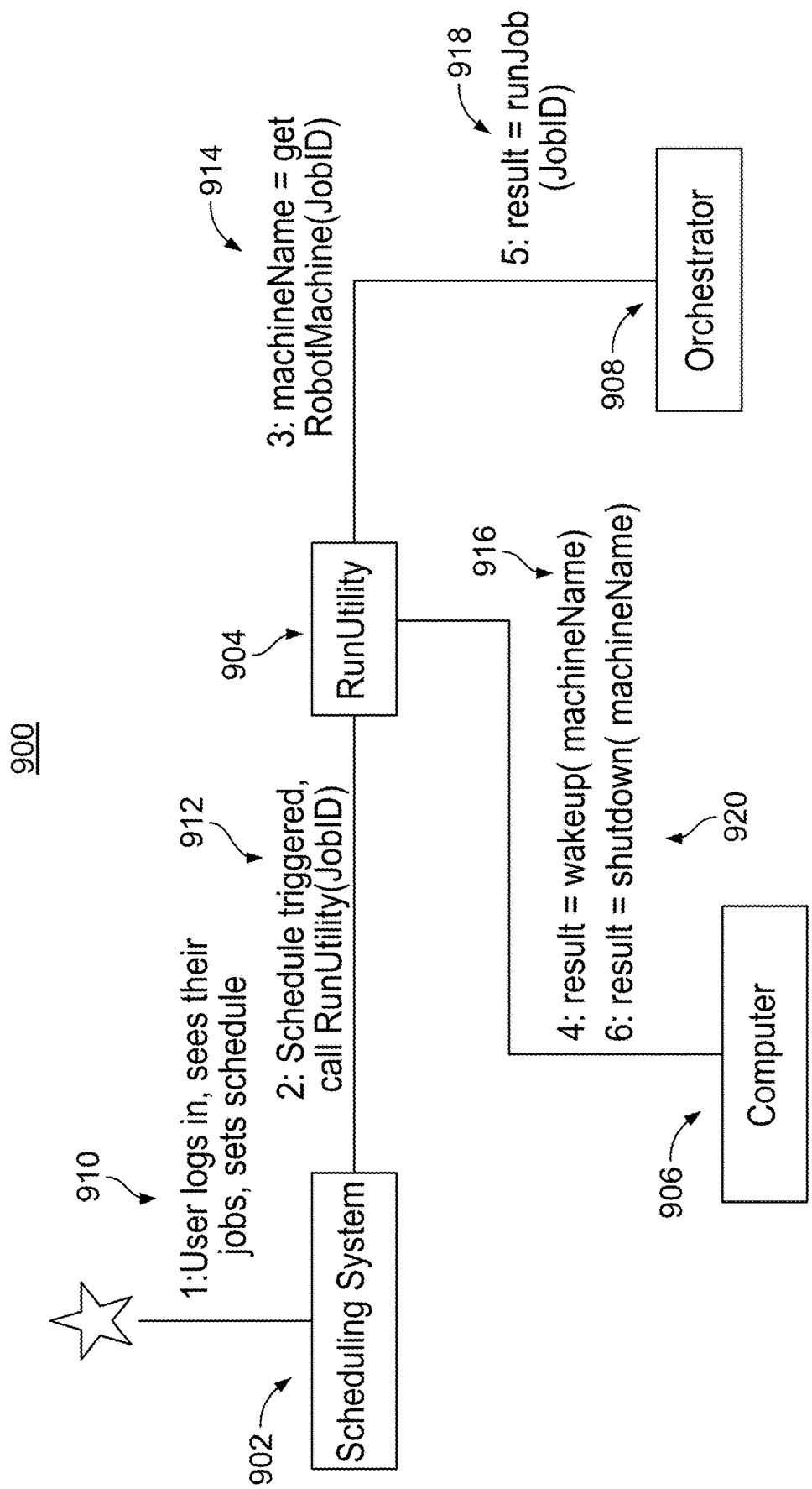
FIG. 9 shows a systems architecture for performing a job, according to an embodiment of the invention.

FIG. 8 shows a method 800 for performing a RPA workflow, in accordance with one or more embodiments. FIG. 8 will be described with reference to systems architecture 900 of FIG. 9. Systems architecture 900 comprises scheduling system 902, run utility 904, computer 906, and orchestrator 908. In one embodiment, scheduling system 902 may be scheduler 502 of FIG. 5 or scheduling system 706 of FIG. 7 and orchestrator 908 may be conductor 104 of FIG. 1, conductor 212 of FIG. 2, conductor 304 of FIG. 3, orchestrator 506 of FIG. 5, or orchestrator 708 of FIG. 7. In some embodiments, run utility 904 may be run on a same device or separate devices as the VDI factor (e.g., VDI factory 504 of FIG. 5). The steps of method 800 may be performed by any suitable computing device.

At step 802, an indication to execute a job for performing an RPA workflow for a user is received. In one embodiment, the job may have been previously scheduled in scheduling system 902 (e.g., for a future time and date or for immediate execution) based on input received from the user. For example, the user may log into scheduling system 902, view jobs of the user, and sets the schedule for the jobs. In one embodiment, the job may be been previously scheduled in scheduling system 902 during a deployment automation stage according, e.g., according to the steps of method 600 of FIG. 6. The workflow may be in the form of an XAML/Package created (e.g., by the user) using, e.g., designer 102 of FIG. 1 or designer 208 of FIG. 2. In one embodiment, the user belongs to a user group associated with access rights in an access rights management system (e.g., active directory 402 of FIG. 4 or active directory 704 of FIG. 7).

The indication to execute the job for performing the RPA workflow for the user may be schedule triggered indication 912 in systems architecture 900 transmitted from scheduling system 902 to run utility 904. In one embodiment, schedule triggered indication 912 is transmitted to run utility 904 in response to a triggering event. The triggering event may be based on a time (e.g., a specific time or an elapsed time), a completion of another job, a manual triggering by the user, or any other suitable triggering event. Schedule triggered indication 912 includes the job ID of the job that has been triggered. Run utility 904 may be any suitable computing device for managing the performance of the job, such as, e.g., a robot, a script, an application, an orchestration system, a navigator, an enterprise connect, a third party system, etc.

At step 804, a robot is identified from a robot group associated with the job. Systems architecture 900 shows a robot ID function 914. Robot ID function 914 represents a request for an identifier of a robot for performing the job from run utility 904 to orchestrator 908, and a response identifying the robot from orchestrator 908 to run utility 904. In particular, run utility 904 transmits a request including the job ID of the job. Orchestrator 908 identifies a robot group associated with the job ID and responds to run utility 904 with a robot ID of a robot in the identified robot group. If the identified robot group comprises more than one robot, the robot ID of a next available robot in the identified robot group is provided. In one embodiment, the identified robot group is associated with the same access rights as the user group in an access rights management system. In one embodiment, where robots are not associated with robot groups, orchestrator 908 determines access rights required for performing the job based on the job ID and dynamically associates a robot to a user group associated with the determined access rights. In this embodiment, when the robot completes the job, the robot may be reassigned to other jobs associated with other robot groups.

At step 806, a computing device (e.g., computer 906) for running the robot is woken up. Run utility 904 transmits a wake up instruction 916 to computer 906 to wake up computer 906. Computer 906 may be any suitable computing device for running the robot associated with the identified robot ID. In one embodiment, computer 906 is cloud based or a virtualized desktop environment.

At step 808, the robot is dispatched to execute the job for performing the RPA workflow on the computing device. Run utility 904 sends a run job instruction 918 to orchestrator 908 to set the woken up computer 906 to a run state. Computer 906 runs the robot, which executes the job.

At step 810, the computing device is shut down after the job is complete. Run utility 904 transmits a shut down instruction 920 to computer 906 to shut down computer 906. Shutting down computer 906 may include powering off, sleeping, suspending, hibernating, etc. computer 906. In one embodiment, shut down instruction 920 is sent to computer 906 in response to an orchestrator web hook call notification from orchestrator 908 to run utility 904 notifying run utility 904 that the job is complete. In another embodiment, shut down instruction 920 is sent to computer 906 after a predetermined period of time of the robot or computer 906 being idle. In another embodiment, computer 906 shuts itself down after a predetermined period of time of being idle. In another embodiment, shut down of computer 906 may be delayed (e.g., for a predetermined period of time) to allow the robot or other robots to complete other jobs.

Advantageously, waking up computer 906 to run a robot to complete a job and shutting down computer 906 once the job is complete reduces the number of robots concurrently executing at a given time, thereby minimizing costs. Scheduling system 902 allows jobs to be scheduled and queued to avoid conflicts within a group. Embodiments of the present invention may have unlimited scale with minimal operation costs.

Figure 10:
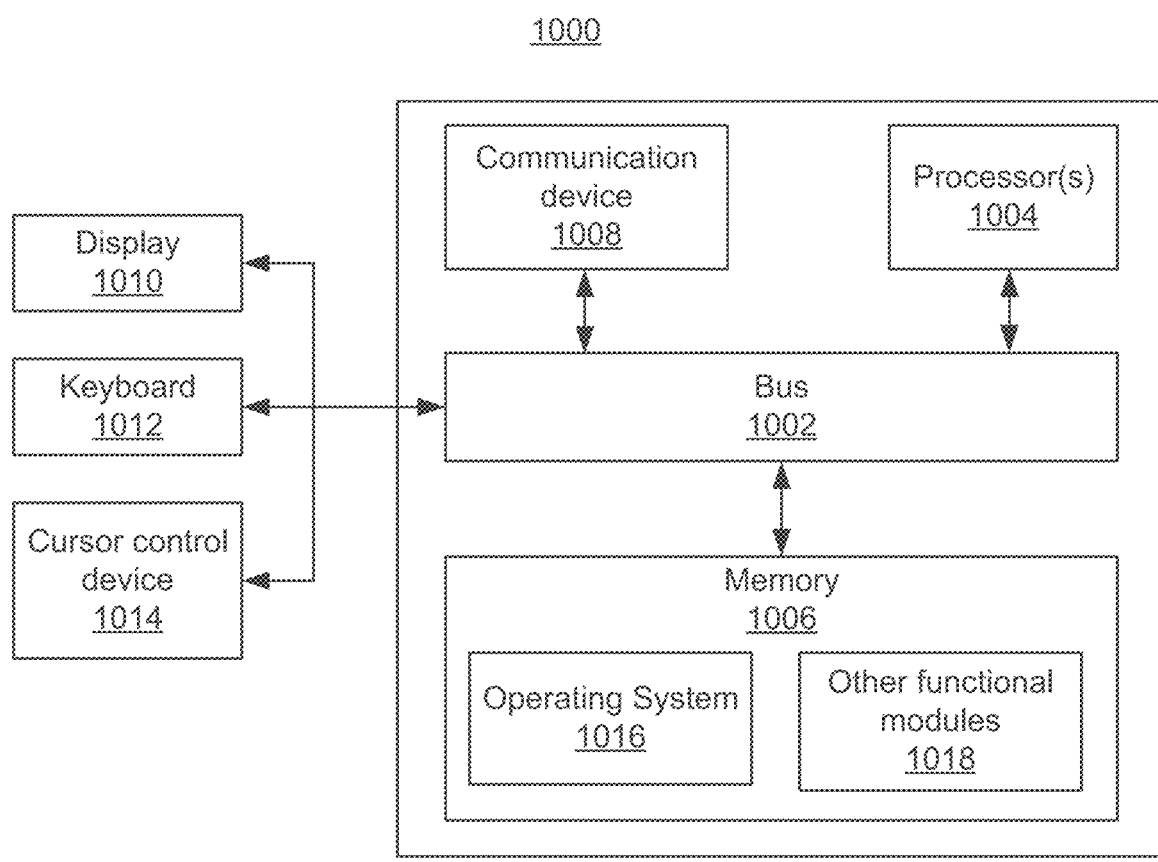
FIG. 10 is a block diagram of a computing system according to an embodiment of the invention.

FIG. 10 is a block diagram illustrating a computing system 1000 configured to execute the methods described in reference to FIGS. 6 and 8, according to an embodiment of the present invention. In some embodiments, computing system 1000 may be one or more of the computing systems depicted and/or described herein. Computing system 1000 includes a bus 1002 or other communication mechanism for communicating information, and processor(s) 1004 coupled to bus 1002 for processing information. Processor(s) 1004 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1004 may also have multiple processing cores, and at least some of the cores may be configured to perform specific functions. Multi-parallel processing may be used in some embodiments.

Computing system 1000 further includes a memory 1006 for storing information and instructions to be executed by processor(s) 1004. Memory 1006 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1004 and may include volatile media, non-volatile media, or both. The media may also be removable, non-removable, or both.

Additionally, computing system 1000 includes a communication device 1008, such as a transceiver, to provide access to a communications network via a wireless and/or wired connection according to any currently existing or future-implemented communications standard and/or protocol.

Processor(s) 1004 are further coupled via bus 1002 to a display 1010 that is suitable for displaying information to a user. Display 1010 may also be configured as a touch display and/or any suitable haptic I/O device.

A keyboard 1012 and a cursor control device 1014, such as a computer mouse, a touchpad, etc., are further coupled to bus 1002 to enable a user to interface with computing system. However, in certain embodiments, a physical keyboard and mouse may not be present, and the user may interact with the device solely through display 1010 and/or a touchpad (not shown). Any type and combination of input devices may be used as a matter of design choice. In certain embodiments, no physical input device and/or display is present. For instance, the user may interact with computing system 1000 remotely via another computing system in communication therewith, or computing system 1000 may operate autonomously.

Memory 1006 stores software modules that provide functionality when executed by processor(s) 1004. The modules include an operating system 1016 for computing system 1000 and one or more additional functional modules 1018 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method for performing a robotic process automation (RPA) workflow, comprising:
    receiving an indication to execute a job scheduled for performing an RPA workflow for a user, the user belonging to a user group associated with access rights;
    identifying a robot from a robot group, the robot group being associated with the same access rights as the user group; and
    dispatching the robot to a computing device to execute the job for performing the RPA workflow.

2. The computer-implemented method of claim 1, further comprising:
    waking up the computing device to run the robot; and
    shutting down the computing device after the robot completes the job.

3. The computer-implemented method of claim 1, wherein identifying a robot from a robot group comprises:
    identifying the robot from the robot group associated with the job.

4. The computer-implemented method of claim 3, wherein identifying the robot from the robot group associated with the job comprises:
    transmitting a request including a job identification (ID) of the job; and
    receiving a robot ID of the robot from the robot group associated with the job ID.

5. The computer-implemented method of claim 1, further comprising:
    maintaining an access rights management system comprising a user group directory associated with the user group and a corresponding robot group directory associated with the robot group, the user group directory associating the user group with the access rights associated with the user group and the robot group directory associating the robot group with the same access rights as the user group.

6. The computer-implemented method of claim 1, wherein receiving an indication to execute a job scheduled for performing an RPA workflow for a user comprises:
    receiving the indication to execute the job scheduled for performing the RPA workflow for the user in response to a triggering event.

7. The computer-implemented method of claim 1, further comprising scheduling the job scheduled for performing the RPA workflow by:
    receiving a request to perform the RPA workflow for the user;
    identifying the robot group as corresponding to the user group; and
    scheduling the job for performing the RPA workflow by the robot of the robot group.

8. A system for performing a robotic process automation (RPA) workflow comprising:
    a memory storing computer program instructions; and
    at least one processor configured to execute the computer program instructions, the computer program instructions configured to cause the at least one processor to perform operations comprising:
        receiving an indication to execute a job scheduled for performing an RPA workflow for a user, the user belonging to a user group associated with access rights;
        identifying a robot from a robot group, the robot group being associated with the same access rights as the user group; and
        dispatching the robot to a computing device to execute the job for performing the RPA workflow.

9. The system of claim 8, the operations further comprising:
    waking up the computing device to run the robot; and
    shutting down the computing device after the robot completes the job.

10. The system of claim 8, wherein identifying a robot from a robot group comprises:
    identifying the robot from the robot group associated with the job.

11. The system of claim 10, wherein identifying the robot from the robot group associated with the job comprises:
    transmitting a request including a job identification (ID) of the job; and
    receiving a robot ID of the robot from the robot group associated with the job ID.

12. The system of claim 8, the operations further comprising:
    maintaining an access rights management system comprising a user group directory associated with the user group and a corresponding robot group directory associated with the robot group, the user group directory associating the user group with the access rights associated with the user group and the robot group directory associating the robot group with the same access rights as the user group.

13. The system of claim 8, wherein receiving an indication to execute a job scheduled for performing an RPA workflow for a user comprises:
    receiving the indication to execute the job scheduled for performing the RPA workflow for the user in response to a triggering event.

14. The system of claim 8, the operations further comprising scheduling the job scheduled for performing the RPA workflow by:
    receiving a request to perform the RPA workflow for the user;
    identifying the robot group as corresponding to the user group; and
    scheduling the job for performing the RPA workflow by the robot of the robot group.

15. A computer program embodied on a non-transitory computer-readable medium for performing a robotic process automation (RPA) workflow, the program configured to cause at least one processor to perform operations comprising:
    receiving an indication to execute a job scheduled for performing an RPA workflow for a user, the user belonging to a user group associated with access rights;
    identifying a robot from a robot group, the robot group being associated with the same access rights as the user group; and dispatching the robot to a computing device to execute the job for performing the RPA workflow.

16. The computer program of claim 15, the operations further comprising:
   waking up the computing device to run the robot; and
   shutting down the computing device after the robot completes the job.

17. The computer program of claim 15, wherein identifying a robot from a robot group comprises:
   identifying the robot from the robot group associated with the job.

18. The computer program of claim 17, wherein identifying the robot from the robot group associated with the job comprises:
   transmitting a request including a job identification (ID) of the job; and
   receiving a robot ID of the robot from the robot group associated with the job ID.

19. The computer program of claim 15, the operations further comprising:
   maintaining an access rights management system comprising a user group directory associated with the user group and a corresponding robot group directory associated with the robot group, the user group directory associating the user group with the access rights associated with the user group and the robot group directory associating the robot group with the same access rights as the user group.

20. The computer program of claim 15, wherein receiving an indication to execute a job scheduled for performing an RPA workflow for a user comprises:
   receiving the indication to execute the job scheduled for performing the RPA workflow for the user in response to a triggering event.

21. The computer program of claim 15, the operations further comprising scheduling the job scheduled for performing the RPA workflow by:
   receiving a request to perform the RPA workflow for the user;
   identifying the robot group as corresponding to the user group; and
   scheduling the job for performing the RPA workflow by the robot of the robot group.

22. A computer-implemented method for scheduling a job for performing a robotic process automation (RPA) workflow, comprising:
   receiving a request to perform an RPA workflow for a user, the user belonging to a user group associated with access rights;
   identifying a robot group corresponding to the user group, the robot group being associated with the same access rights as the user group; and
   scheduling a job for performing the RPA workflow on a robot of the robot group.

23. The computer-implemented method of claim 22, further comprising:
   maintaining an access rights management system comprising a user group directory associated with the user group and a corresponding robot group directory associated with the robot group, the user group directory associating the user group with the access rights associated with the user group and the robot group directory associating the robot group with the same access rights as the user group.

24. The computer-implemented method of claim 23, wherein identifying a robot group corresponding to the user group comprises:
   transmitting a request including a user identification (ID) of the user to the access rights management system; and
   receiving a robot group ID of the robot group corresponding to the user ID from the access rights management system.

25. The computer-implemented method of claim 22, further comprising dispatching the robot to execute the job for performing the RPA workflow by:
   receiving an indication to execute the job scheduled for performing the RPA workflow for the user;
   identifying the robot from the robot group; and
   dispatching the robot to a computing device to execute the job for performing the RPA workflow.

26. A system for scheduling a job for performing a robotic process automation (RPA) workflow comprising:
   a memory storing computer program instructions; and
   at least one processor configured to execute the computer program instructions, the computer program instructions configured to cause the at least one processor to perform operations comprising:
      receiving a request to perform an RPA workflow for a user, the user belonging to a user group associated with access rights;
      identifying a robot group corresponding to the user group, the robot group being associated with the same access rights as the user group; and
      scheduling a job for performing the RPA workflow on a robot of the robot group.

27. The system of claim 26, the operations further comprising:
   maintaining an access rights management system comprising a user group directory associated with the user group and a corresponding robot group directory associated with the robot group, the user group directory associating the user group with the access rights associated with the user group and the robot group directory associating the robot group with the same access rights as the user group.

28. The system of claim 27, wherein identifying a robot group corresponding to the user group comprises:
   transmitting a request including a user identification (ID) of the user to the access rights management system; and
   receiving a robot group ID of the robot group corresponding to the user ID from the access rights management system.

29. The system of claim 26, the operations further comprising dispatching the robot to execute the job for performing the RPA workflow by:
   receiving an indication to execute the job scheduled for performing the RPA workflow for the user;
   identifying the robot from the robot group; and
   dispatching the robot to a computing device to execute the job for performing the RPA workflow.

30. A computer program embodied on a non-transitory computer-readable medium for scheduling a job for performing a robotic process automation (RPA) workflow, the program configured to cause at least one processor to perform operations comprising:
   receiving a request to perform an RPA workflow for a user, the user belonging to a user group associated with access rights;
   identifying a robot group corresponding to the user group, the robot group being associated with the same access rights as the user group; and
   scheduling a job for performing the RPA workflow on a robot of the robot group.

31. The computer program of claim 30, the operations further comprising:
   maintaining an access rights management system comprising a user group directory associated with the user group and a corresponding robot group directory associated with the robot group, the user group directory associating the user group with the access rights associated with the user group and the robot group directory associating the robot group with the same access rights as the user group.

32. The computer program of claim 31, wherein identifying a robot group corresponding to the user group comprises:
   transmitting a request including a user identification (ID) of the user to the access rights management system; and
   receiving a robot group ID of the robot group corresponding to the user ID from the access rights management system.

33. The computer program of claim 30, the operations further comprising dispatching the robot to execute the job for performing the RPA workflow by:
   receiving an indication to execute the job scheduled for performing the RPA workflow for the user;
   identifying the robot from the robot group; and
   dispatching the robot to a computing device to execute the job for performing the RPA workflow.

34. The computer-implemented method of claim 1, wherein the receiving, the identifying, and the dispatching are performed by one or more computing devices implemented in a cloud computing system.

35. The computer-implemented method of claim 1, wherein the computing device is a cloud based computing device.

36. The system of claim 8, wherein the system is implemented in a cloud computing system.

37. The system of claim 8, wherein the computing device is a cloud based computing device.

38. The computer program of claim 15, wherein the at least one processor is implemented in one or more computing devices and the one or more computing devices are implemented in a cloud computing system.

39. The computer program of claim 15, wherein the computing device is a cloud based computing device.

40. The computer-implemented method of claim 22, wherein the receiving, the identifying, and the scheduling are performed by one or more computing devices implemented in a cloud computing system.

41. The computer-implemented method of claim 25, wherein the computing device is a cloud based computing device.

42. The system of claim 26, wherein the system is implemented in a cloud computing system.

43. The system of claim 29, wherein the computing device is a cloud based computing device.

44. The computer program of claim 30, wherein the at least one processor is implemented in one or more computing devices and the one or more computing devices are implemented in a cloud computing system.

45. The computer program of claim 33, wherein the computing device is a cloud based computing device.

* * * * *

UNITED STATES PATENT AND TRADEMARK OFFICE
CERTIFICATE OF CORRECTION

| | | |
|---|---|---|
| PATENT NO. | : 11,110,601 B2 | Page 1 of 1 |
| APPLICATION NO. | : 16/689193 | |
| DATED | : September 7, 2021 | |
| INVENTOR(S) | : Daniel Bannoura | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 113 days.

Signed and Sealed this
Twenty-fifth Day of October, 2022

*Katherine Kelly Vidal*

Katherine Kelly Vidal
*Director of the United States Patent and Trademark Office*